Figure 1:
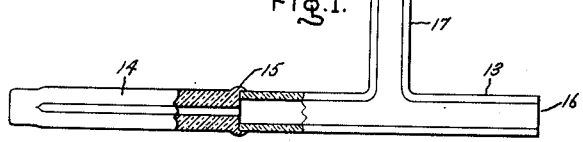

Aug. 11, 1953  A. F. TORRISI ET AL  2,648,120
CAPACITOR AND METHOD OF MANUFACTURE
Filed July 14, 1951

Inventors:
Alfred F. Torrisi,
Frederick W. Grahame,
by Ernest C. Britton
Their Attorney.

Patented Aug. 11, 1953

2,648,120

UNITED STATES PATENT OFFICE 2,648,120

CAPACITOR AND METHOD OF MANUFACTURE

Alfred F. Torrisi and Frederick W. Grahame, Pittsfield, Mass., assignors to General Electric Company, a corporation of New York Application July 14, 1951, Serial No. 236,768

3 Claims. (Cl. 29—25.42)

1

This invention relates to electric condensers or capacitors and more particularly to a method of manufacturing a hermetically sealed electrolytic capacitor of the wound type with terminal leads of tantalum metal.

As is well known in the industry, the sealing of a capacitor body within a tight enclosure or case is essential so that air and moisture will not degrade the electrical properties of the capacitor while in service below its initial or original properties when first manufactured. However, the realization of an absolutely tight enclosure is complicated by the difficulty experienced in obtaining a tight joint at the points where the terminal leads of the capacitor pass through the casing to the exterior thereof. Resilient bushings have been employed at these points but the cold flow properties of most resilient materials are such that the joint eventually leaks. To eliminate a joint between a capacitor case proper and end caps through which terminal leads pass and also to minimize or prevent corrosion, casings or enclosures of glass material have also been employed with the terminal leads fused to the glass. The use of this material has, however, presented a problem in the case of capacitors intended for service conditions in connection with rockets, jet planes and other modern applications where capacitor units are commonly exposed to a temperature as low as minus 55° C. and then, in a matter of seconds, subjected to a temperature as high as 200° C. or vice versa. Such widely varying and suddenly changing temperatures necessitate the employment of a thermal shock resistant grade of glass, preferably one having a coefficient of linear expansion no greater than .0000036 per degree C. In contrast, the various metals which are desirable for use as condenser terminals or leads such as tantalum, columbium, zironium, aluminum and other desirable valve forming metals and to which the glass must be sealingly fused, all have a coefficient of expansion in excess of .000005 per degree C. Because of these differences in coefficient of expansion, attempts to seal such leads to the most readily available and desirable grades of thermal shock resistant glass have resulted in failure since, after having been sealed thereto, the metal leads contract upon cooling more rapidly than the glass thereby setting up strains which cause a mechanically weak joint which cracks and is not leak-proof. This defect is particularly serious in the case of an electrolytic type capacitor inasmuch as electrolyte loss by evaporation tends to appreciably decrease the life of such a unit. Otherwise, the employment of a casing or enclosure entirely of glass, particularly because of the absence of other joints, would be desirable, especially in the case of electrolytic type capacitors where corrosion is a problem provided the unit could be made hermetically sealed.

It is, therefore, an object of this invention to provide a novel method of constructing capacitors.

It is also an object of this invention to provide a novel method of hermetically sealing an electrolytic type capacitor having terminal leads of tantalum metal within a container consisting entirely of glass having a coefficient of expansion substantially different from that of the tantalum leads.

Figure 5:
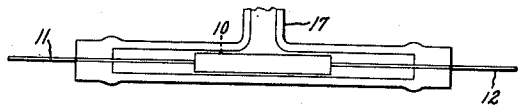
Figure 6:
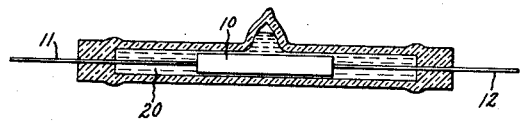

The invention will be better understood from the following description when taken in connection with the accompanying drawing and the scope of the invention will be pointed out in the appended claims. In the drawings, Figs. 1 through 6 inclusive illustrate successive steps in the method of constructing or manufacturing a capacitor in accordance with the invention. Fig. 6 also illustrates the completed capacitor in cross section.

Figure 2:
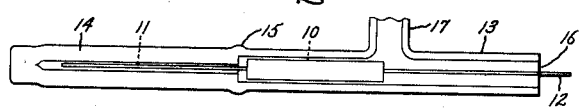
Figure 3:
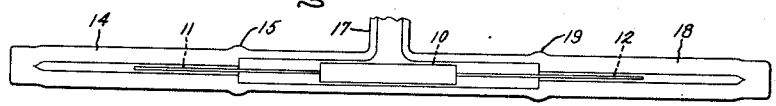
Figure 4:
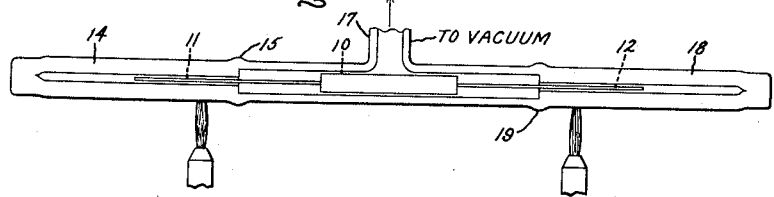

Referring now more specifically to the details of the various figures, the numeral 10 identifies a capacitor body comprising alternate strips or foils of film forming metal such as tantalum and porous spacer material such as paper or glass fiber rolled into a compact roll as illustrated. In the case of tantalum foil, a pair of wire terminal leads 11 and 12 of tantalum metal are electrically connected respectively to foils of opposite polarity and project or extend beyond opposite ends of the roll as shown. In accordance with the invention, the capacitor body 10 is hermetically sealed within a non-corrosive casing by first providing a conventional T-shaped tube 13 of the thermal shock resistant glass and having an inside diameter slightly greater than the diameter of the capacitor roll. Next, the open end of a sealed glass tube 14 having a bore slightly greater than the diameter of the wire leads and having a relatively heavy wall thickness compared to the wall thickness of the T-shaped tube, such as a capillary tube, or one presenting a relatively large mass of glass compared to the cross sectional mass of metal in the leads is fused at 15 to one end of the run of the T-shaped case or container 13. The capacitor roll 10 is then inserted through the opposite end of the run 16 of the T-shaped tube and one of the leads 11 is pushed into the bore of the capillary tube 14 so that the capacitor body 10 will be off center with respect to the lateral branch 17 of the T-shaped tube as illustrated by Fig. 2. Thereafter, the open end of another seal capillary tube 18, similar to capillary tube 14, is fused at 19 to the end 16 of the T-shaped tube. Capacitor roll 10 may then be moved to the right and the lead 12 moved further into the bore of capillary tube 18, a distance approximately equal to the distance lead 11 extends into the bore of tube 14 until the roll is approximately centered as shown in Fig. 3. Of course, if the spacer material between the foils is not paper but of some heat resistant material, such as fiber glass, there would be no necessity of initially positioning the capacitor body off center within the case since there would be no danger of the heat, resulting from the fusing of capillary tube 18 to the end 16 of the T-shaped tube, damaging such heat resisting material. In fact, it will be apparent that the employment of such material would permit fusing of both capillary tubes to the T-shape tube subsequent to insertion of the capacitor body therein. Thereafter the tantalum leads are sealed or the glass is fused to the leads by application of a source of heat such as a flame to a portion of the capillary tubes adjacent the fused joints 15 and 19 respectively illustrated in Fig. 4. Prior to this step, however, the lateral branch 17 is connected to a source of vacuum and the container evacuated since tantalum metal tends to become highly oxidized when subjected to heat in the presence of air in which event the tantalum leads would become brittle and thus be subject to quick breakage upon handling in service. In other words, the glass is fused to the leads under vacuum conditions in the case of tantalum leads although it should be appreciated that this step may be undertaken in the absence of a vacuum or in the presence of an inert atmosphere in the case of some other metals. Although most grades of glass conveniently available and otherwise suitable may have a different coefficient of expansion from that of the tantalum leads, the glass nevertheless will not pull away from the leads upon cooling or contracting because of the relatively large mass involved. Thus, we are able in the practice of this method to obtain a seal which is as mechanically strong and tight as is usually obtained in the case of fusing a glass to a metal both of which have matching coefficients of expansion. Subsequent to the sealing of the leads to the glass case, the portions of the capillary tubes 14 and 18 exterior the portions fused to the leads are scratched with a file and then broken off so that leads 11 and 12 will project from opposite ends of the glass containers as illustrated in Fig. 5. In the case of an electrolytic capacitor, the glass container is next filled through the only remaining opening in lateral branch 17 with an impregnating fluid or electrolyte 20 after which the branch 17 is flame sealed as illustrated in Fig. 6. This flame seal may or may not be done in vacuo.

Thus, we have provided a practical and an economical method whereby the terminal leads of a capacitor may be simply and tightly sealed to an enclosing casing of glass, the coefficient of expansion of which may not match the coefficient of expansion of the metal of the leads.

While we have, in accordance with the patent statutes, shown and described a particular embodiment of our invention, it will be obvious that changes and modifications can be made without departing from the invention in its broader aspects and we, therefore, aim in the appended claims to cover all such changes and modifications as fall within the true spirit and scope of the invention.

Claims directed to a sealed condenser structure of the type described herein are in divisional application, Serial No. 274,322, filed March 1, 1952.

What we claim as new and desire to secure by Letters Patent of the United States is:

1. In the manufacture of a capacitor having alternate sheets of dielectric material and conducting foil wound into a roll with a pair of terminal lead wires extending respectively from opposite ends of said roll, the method of hermetically sealing said roll within a T-shaped tubular glass case having an inside diameter greater than the diameter of said roll which comprises the steps of fusing the open end of a sealed capillary tube to one end of the run of said T-shaped case, inserting said roll through the opposite end of said case and one of said leads into the bore of said capillary tube so that said roll will be off center with respect to the lateral branch of said T-shaped case, fusing the open end of a second sealed capillary tube to said opposite end of said T-shaped case, moving said roll to the center of said case so that the other of said leads will extend into the bore of said second capillary tube a distance equal to the extension of said one lead into the bore of said first mentioned capillary tube, applying a vacuum to the lateral branch opening of said T-shaped case, then applying heat respectively to the portions of said capillary tubes adjacent the fused joint therebetween and said T-shaped tube whereby said leads are respectively and sealingly fused to said capillary tube, respectively breaking off the remaining portion of said capillary tubes exterior the portions fused to said leads, and then sealing off said lateral branch.

2. In the manufacture of a capacitor having alternate sheets of dielectric material and conducting foil wound into a roll with a pair of terminal lead wires having a coefficient of thermal expansion in excess of .000005 per degree C. extending respectively from opposite ends of said roll, the method of hermetically sealing said roll within a T-shaped tubular glass case having an inside diameter slightly greater than the diameter of said roll which comprises the steps of fusing one end of a glass capillary tube having a coefficient of thermal expansion less than .000004 per degree C. to one end of the run of said T-shaped case, inserting said roll through the opposite end of said case and one of said leads into the bore of said capillary tube so that said roll will be off center with respect to the lateral branch of said T-shaped case, fusing one end of a second and similar glass capillary tube to said opposite end of said T-shaped case, moving said roll to the center of said case so that the other of said leads will extend into the bore of said second capillary tube a distance equal to the extension of said one lead into the bore of said first mentioned capillary tube, then applying heat respectively to the portions of said capillary tubes adjacent the fused joint therebetween and said T-shaped tube whereby said leads are respectively and sealingly fused to said capillary tube, respectively breaking off the remaining portion of said capillary tubes exterior the portions fused to said leads, filling said case through said lateral opening with an impregnating fluid, and then sealing off said lateral branch.

3. In the manufacture of a capacitor comprising a capacitor body proper and a pair of terminal lead wires having a coefficient of thermal expansion in excess of .000005 per degree C., the method of hermetically sealing said body within an open ended tubular shaped glass case having an opening intermediate the opposite ends thereof which comprises the steps of fusing one end of a glass capillary tube having a coefficient of thermal expansion less than .000004 per degree C. to one end of said tubular case, inserting said body through the opposite end of said case and one of said leads into the bore of said capillary tube with the other of said leads extending exteriorly beyond said opposite end, inserting said other lead into the bore and fusing one end of a second and similar glass capillary tube to said opposite end of said case, then applying heat respectively to the portions of said capillary tubes adjacent the fused joints therebetween and said tubular case whereby said leads are respectively and sealingly fused to said capillary tubes, respectively breaking off the remaining portions of said capillary tubes exterior the portions fused to said leads and then sealing off said intermediate opening of said glass case.

ALFRED F. TORRISI.
        FREDERICK W. GRAHAME.

References Cited in the file of this patent

UNITED STATES PATENTS

| Number | Name | Date |
|---|---|---|
| 1,354,146 | Thomas | Sept. 28, 1920 |
| 1,594,124 | Shrader | July 27, 1926 |
| 1,802,371 | Bullivant | Apr. 28, 1931 |
| 1,832,466 | Means | Nov. 17, 1931 |
| 1,996,123 | Rodgers | Apr. 2, 1935 |
| 2,215,641 | Freeman | Sept. 24, 1940 |
| 2,368,688 | Taylor | Feb. 6, 1945 |
| 2,393,966 | Brennan | Feb. 5, 1946 |
| 2,504,178 | Burnham | Apr. 18, 1950 |
| 2,569,723 | Koerbis | Oct. 2, 1951 |

FOREIGN PATENTS

| Number | Country | Date |
|---|---|---|
| 489,626 | Great Britain | July 28, 1938 |
| 727,527 | Germany | Nov. 5, 1942 |